July 28, 1964  A. J. ATKINS  3,142,369
FLUID POWER TRANSMITTERS

Filed June 27, 1961  6 Sheets-Sheet 1

ALAN J. ATKINS
INVENTOR

BY Lawrence J. Winter

ATTORNEY

July 28, 1964 A. J. ATKINS 3,142,369
FLUID POWER TRANSMITTERS
Filed June 27, 1961 6 Sheets-Sheet 2
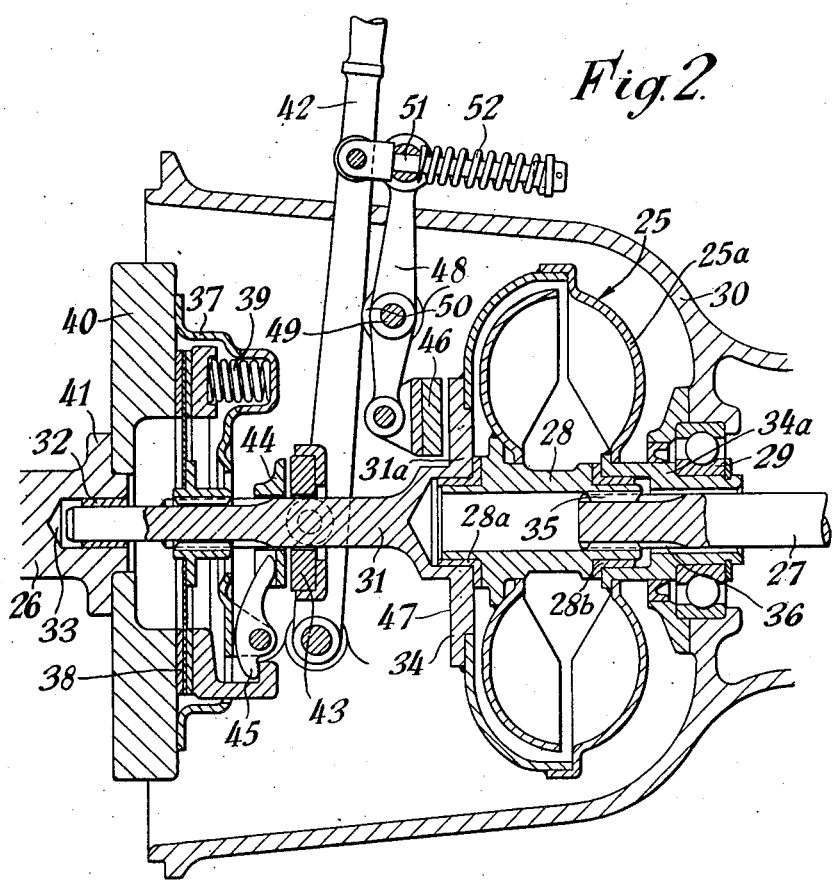
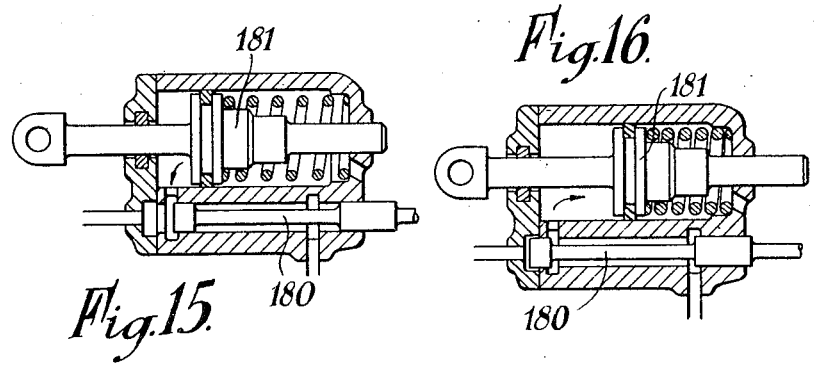
ALAN J. ATKINS
INVENTOR
BY Lawrence J. Winter
ATTORNEY July 28, 1964 A. J. ATKINS 3,142,369
FLUID POWER TRANSMITTERS
Filed June 27, 1961 6 Sheets-Sheet 3
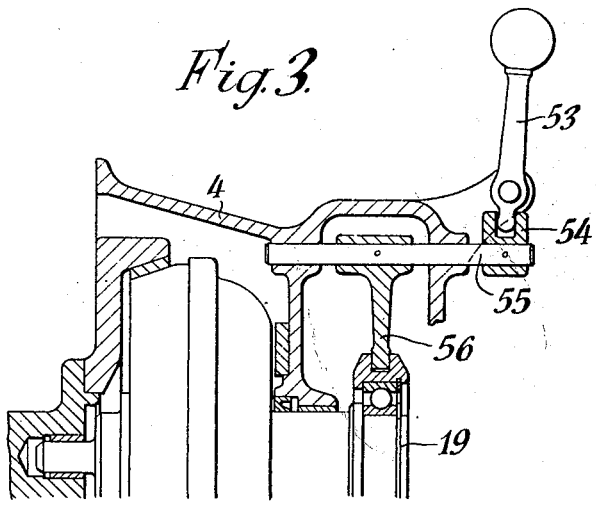
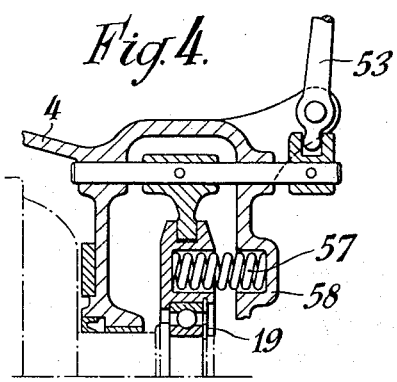 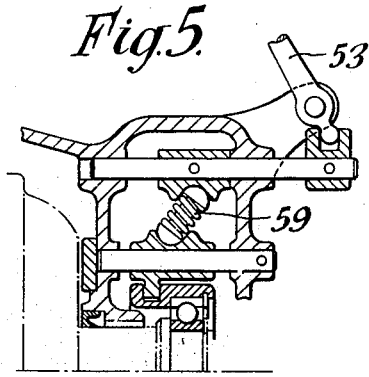
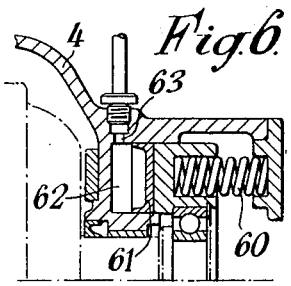 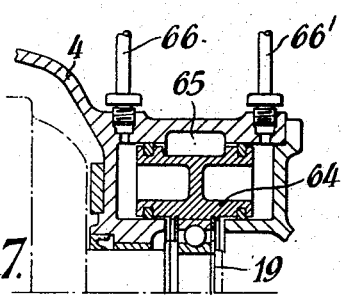
ALAN J. ATKINS
INVENTOR
BY Lawrence J. Winter
ATTORNEY July 28, 1964 A. J. ATKINS 3,142,369
FLUID POWER TRANSMITTERS
Filed June 27, 1961 6 Sheets-Sheet 4
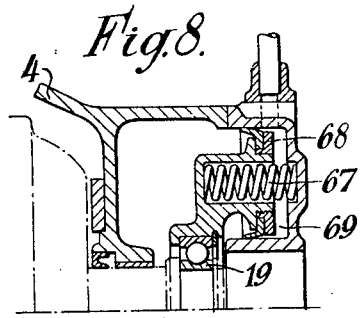
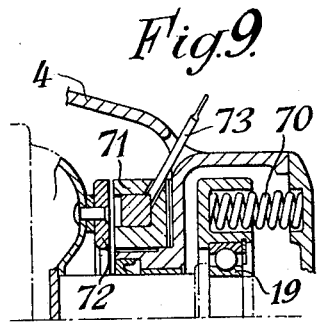
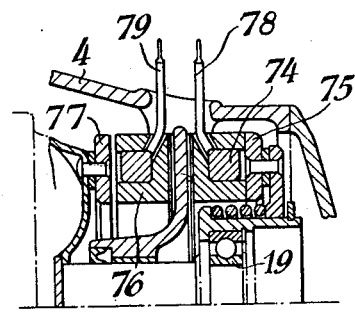
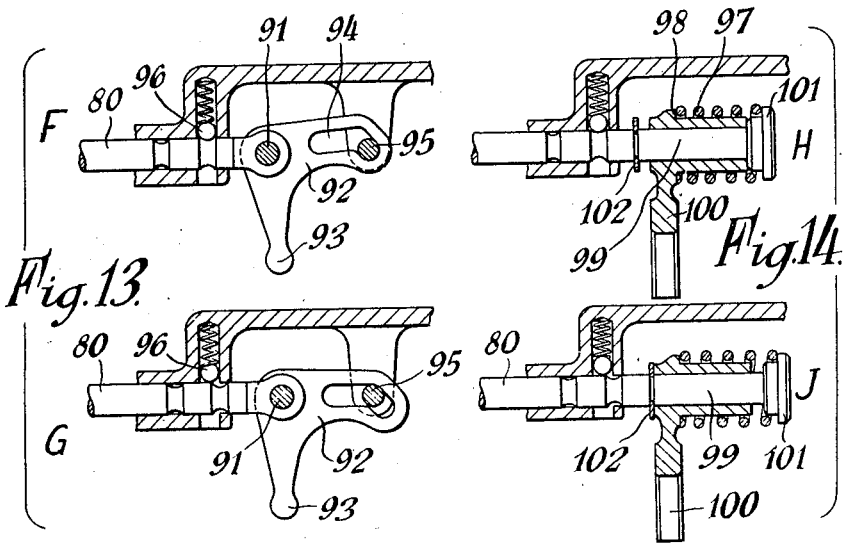
ALAN J. ATKINS
INVENTOR
BY Lawrence J. Writer
ATTORNEY July 28, 1964    A. J. ATKINS    3,142,369
FLUID POWER TRANSMITTERS
Filed June 27, 1961    6 Sheets-Sheet 5
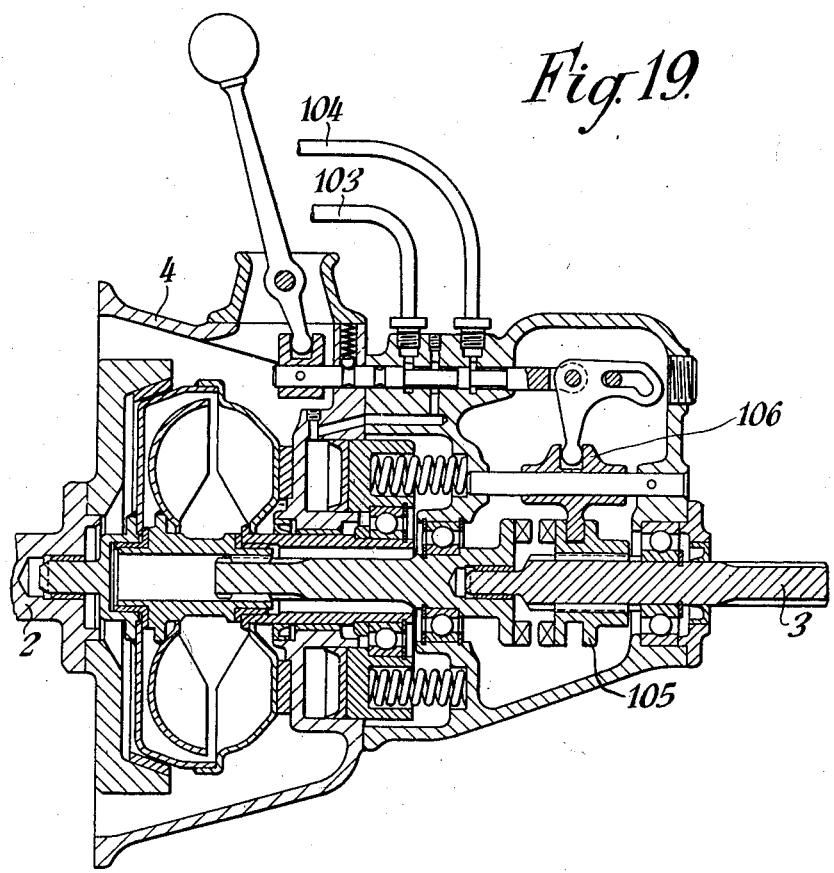
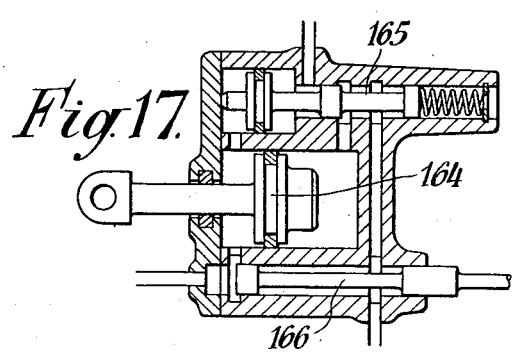
ALAN J. ATKINS
INVENTOR July 28, 1964     A. J. ATKINS     3,142,369
FLUID POWER TRANSMITTERS
Filed June 27, 1961     6 Sheets-Sheet 6
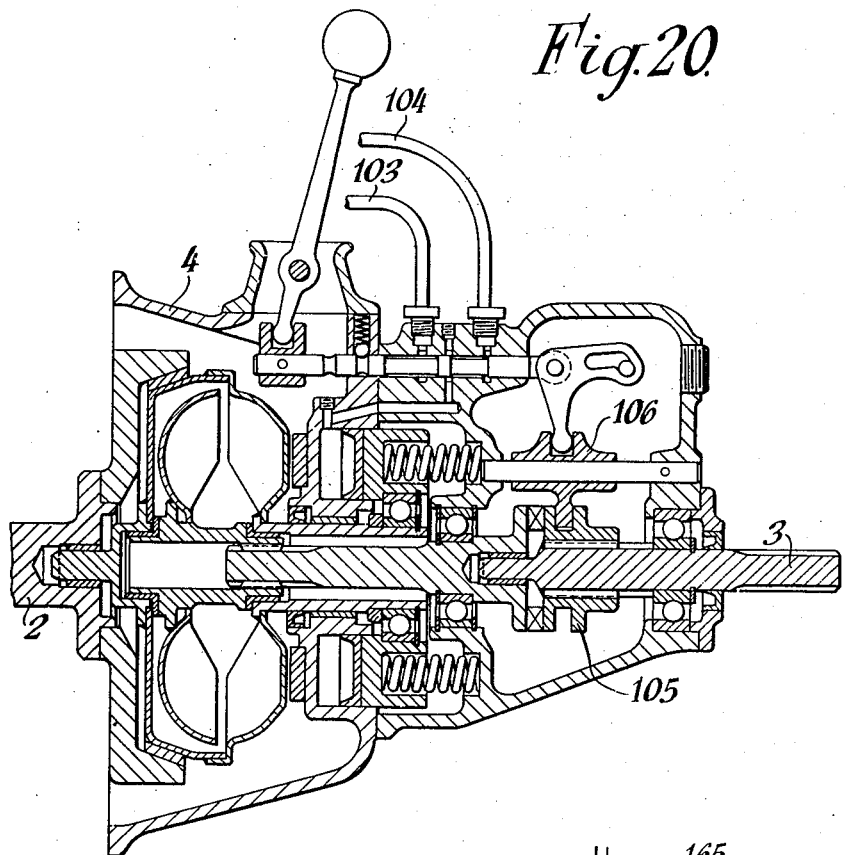
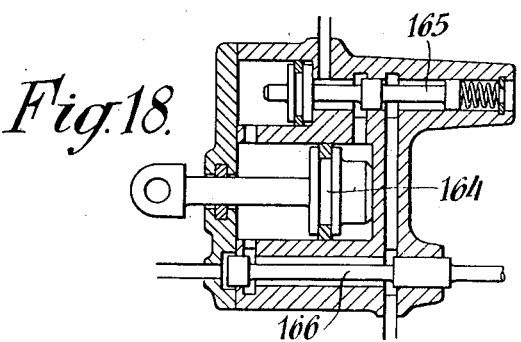
ALAN J. ATKINS
INVENTOR
BY *Lawrence J. Winter*
ATTORNEY

United States Patent Office 3,142,369
Patented July 28, 1964

3,142,369
FLUID POWER TRANSMITTERS
Alan J. Atkins, Leamington Spa, England, assignor to Automatic Products Company Limited, Leamington Spa, England
Filed June 27, 1961, Ser. No. 119,956
Claims priority, application Great Britain June 29, 1960
6 Claims. (Cl. 192—3.2)

This invention relates to fluid power transmitters for providing a drive between a power unit and means to be driven thereby.

The invention has for its object to provide an arrangement of fluid power transmitter which eliminates the undesirable loads imposed on the driven means due to the inherent drag in the fluid power transmitter. To this end it is proposed in accordance with the invention to provide a fluid power transmitter including clutch means for connecting or disconnecting the fluid power transmitter to or from the power input to the fluid power transmitter. Means can also be incorporated in the arrangement to hold the fluid power transmitter against rotational movement when disconnected. The invention can be carried out for example by providing for relative axial movement between the fluid power transmitter and a drive member associated with a power unit driving the fluid power transmitter, the relative axial movement in one direction being combined with disengagement of a clutch connecting the fluid power transmitter to the drive member and the application of braking means to the fluid power transmitter. The movement of the fluid power transmitter out of engagement with the driving member can be effected by fluid pressure means, or by mechanical means, such means acting against spring loading urging the fluid power transmitter into engagement with said driving member.

The invention can be applied to fluid power transmitters utilising either liquid or dry powder or other substance in flowable form as the fluid and which gives rise to drag torque.

Embodiments of the invention will now be described by way of example by aid of the accompanying diagrammatic drawings in which:

FIGURE 2 shows in longitudinal section a fluid coupling according to a further embodiment of the invention;

FIGURES 3 to 10 are fragmentary views in section of alternative means for effecting the axial displacement of the fluid torque transmitter;

FIGURE 13 shows in section means for operating the control valve, the separate views F and G indicating different operative positions;

FIGURE 14 shows in section further means for operating the control valve, the separate views H, J indicating different operative positions of such means;

FIGURES 15 and 16 are fragmentary views showing in section another form of fluid pressure control means for effecting the axial displacement of the fluid power transmitter, the figures indicating different positions;

FIGURES 17 and 18 are also fragmentary views showing in section a still further form of fluid pressure control means for effecting the axial displacement the figures indicating different positions;

FIGURES 19 and 20 show in section a fluid coupling embodying fluid pressure means for effecting the axial displacement and incorporating the means shown in FIGURES 6, 11 and 13, FIGURE 19 showing the disengaged position and FIGURE 20 the engaged position.

Figure 1:
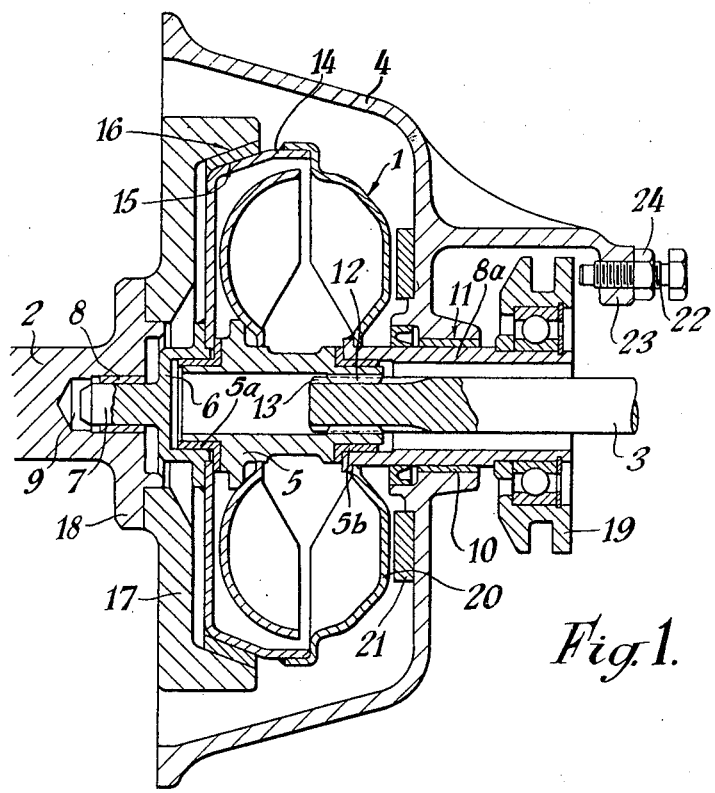
FIGURE 1 shows in longitudinal section a fluid coupling arrangement according to one embodiment of the invention.

In the arrangement shown diagrammatically in FIGURE 1 the fluid coupling denoted generally by reference numeral 1 provides a driving connection between the driving shaft 2, which may be the crank shaft of an internal combustion engine, and the input or driven shaft 3 to for example, a variable speed gear, not shown, the fluid coupling being enclosed within a stationary housing 4. Coupling 1 consists of a closed casing 14 in which is disposed an impeller fixed to the casing, and a conventional turbine for rotation by the fluid in the casing.

The turbine is fixed to a hollow sleeve 5 mounted in bearings 5a and 5b disposed on opposite ends of the sleeve. One end of the sleeve 5 is closed off by an end cap mounted over bearing 5a. The end cap 6 is provided with a stub axle 7 rotatably mounted within a plain bearing 8. Bearing 8 is disposed within a recess 9 in the end of the driving shaft 2.

A second sleeve 8a extends through a plain bearing 10 disposed adjacent the central opening or bore 11 provided in the stationary housing 4. The second sleeve 8a is fixed to fluid coupling casing 14 and stub axle 7 for rotation therewith.

Sleeve 5 is provided with a plurality of internal splines 12 adjacent bearing 5b which engage mating external splines 13 on the input or driven shaft 3.

Rotation of fluid coupling casing 14 and its impeller drives or rotates the turbine and sleeve 5 fixed to the turbine, and the drive from sleeve 5 is transmitted to the input or driven shaft 3 through the mating splines 12 and 13.

The exterior of the casing 14 of the fluid coupling is provided at one side with a peripheral tapered surface 15 which provides the movable element of a cone clutch the other element of which is provided by the co-operating tapered internal surface 16 formed on a flywheel 17 secured to the driving flange 18 on the driving shaft 2. The end of the second sleeve 8a extending through the plain bearing 10 carries a thrust bearing ring 19 which is secured axially in position on the sleeve 8a for axial displacement of the sleeve 8a by operating means not shown resulting in corresponding axial displacement of the fluid coupling either towards or away from the flywheel 17 dependent upon the direction of axial movement of the thrust bearing ring. The axial movement of the trust bearing ring 19 towards the flywheel causes engagement between the co-operating cone clutch elements to couple the driving and driven shafts through the fluid coupling 1 as shown in FIGURE 1, reverse movement of the thrust bearing ring causing corresponding movement of the fluid coupling with resulting disengagement of the clutch elements so that the drive between the driving and driven shafts is interrupted the axial movement in this direction being sufficient to bring an annular braking surface on the side 20 of the casing of the fluid coupling into braking contact with a co-operating stationary annular braking element 21 carried by the housing so that the fluid coupling is held against rotation.

In an arrangement in which braking of the fluid coupling is not provided for, for example when the annular braking element 21 is eliminated, a stop is provided to limit the axial displacement of the fluid coupling. As shown in FIGURE 1, the stop can be formed by a bolt 22 screwed into a tapped hole in a lug 23 on the housing the bolt being positioned so that the thrust bearing ring contacts the same at the limit of axial movement. The amount of axial displacement can be varied by adjusting the bolt a lock nut 24 being provided to secure the bolt in the adjusted position.

In the alternative arrangement shown in FIGURE 2 the fluid coupling is fixed axially in position disconnection of the drive between the driving and input or driven shafts being obtained by operation of an independent clutch.

As shown in FIGURE 2, the fluid coupling denoted generally by reference numeral 25 provides a driving connection between a driving shaft 26, which can be the crankshaft of an internal combustion engine, and the input or driven shaft 27 to a variable speed gear, not shown.

The turbine within the coupling casing 25a is fixed to a hollow sleeve 28 having its opposite ends journalled within sleeve bearings 28a and 28b disposed on opposite ends of the sleeve. One end of sleeve 28 is closed off by an end cap 31a provided with a stub axle 31. The end cap 31a is mounted around bearing 28a. Stub axle 31 is rotatably mounted within a sleeve bearing 32 that is disposed within a recess 33 in the end of driving shaft 26.

A second sleeve 34a extends through a central opening or bore provided in housing 30 and is journalled within a bearing 29 in said bore. Second sleeve 34a is fixed by welding or similar means to casing 25a and stub axle 31 for rotation therewith.

Sleeve 28 is provided with a plurality of internal splines 35 adjacent bearing 28b which engage mating external splines 36 on input or driven shaft 27.

Rotation of fluid coupling casing 25a and its impeller drives or rotates the turbine and sleeve 28 fixed to the turbine, and the drive from sleeve 28 is transmitted to the input or driven shaft 27 through the mating splines 35 and 36.

The drive from the driving shaft to the fluid coupling is transmitted through a single plate clutch denoted generally by reference numeral 37. The clutch is mounted around the stub shaft 31 the clutch plate 38 being splined on the stub shaft and held by the clutch springs 39 in driving engagement with a flywheel 40 secured to the flange 41 of the driving shaft. Clutch disengagement to interrupt the drive to the fluid coupling is effected by operation of an operating lever 42 through a clutch release bearing 43, actuation of the lever 42 in the appropriate direction causing the release bearing 43 to contact the thrust ring 44 to axially displace the same and cause pivotal movement of the clutch release levers 45.

Movement of the operating lever 42 to effect clutch disengagement also results in actuation of braking means to hold the fluid coupling against rotation. The braking means consists of a brake pad 46 which is engageable with a co-operating braking surface 47 on the casing of the fluid coupling, the brake pad being carried on a shoe pivotally attached to the lower end of a brake lever 48. The brake lever is pivotally mounted intermediate its length on a pivot pin 49 on a boss 50 formed on the housing 30 the upper end of the brake lever being coupled to a rod 51 one end of which is pivotally connected to the clutch operating lever. The rod 51 is spring loaded by a compression spring 52 to facilitate operation of the brake.

In both of the arrangements described above axial displacement of the fluid converter in the arrangement of FIGURE 1 or of the clutch in the arrangement of FIGURE 2 can be effected by manually operated means or automatically by for example fluid pressure operated means or electrically operated means, and FIGURES 3 to 10 of the accompanying drawings show various means for this purpose which are primarily intended for an arrangement of the kind disclosed in FIGURE 1, and accordingly are described as applied thereto, the same reference numerals as in FIGURE 1 being used where applicable to denote corresponding parts of the fluid coupling.

In the arrangement according to FIGURE 3, operation is wholly manual, the axial displacement of the fluid coupling in one direction or the other being effected by appropriate operation of a hand lever 53 pivotally mounted on the housing 4 the inner end of the lever engaging a collar 54 on a slide rod 55 slidably mounted in the housing, the rod carrying an operating fork 56 engaging the bearing thrust ring 19.

The arrangement of FIGURE 4 is substantially identical with that of FIGURE 3 but with the addition of spring loading to urge the fluid coupling to the clutch engaged position. For this purpose a compression spring 57 is located between the bearing thrust ring 19 and a lug 58 on the housing 4. Alternatively, the spring can be arranged to urge the fluid coupling to the clutch disengaged position.

As shown in FIGURE 5 the hand lever 53 effects axial displacement of the fluid coupling through a toggle device shown generally at 59. The construction and operation of this device is clear from the drawings and accordingly does not require detailed description.

FIGURE 6 discloses an arrangement in which the fluid coupling is spring loaded so as to be urged to the clutch engaged position axial displacement against the spring action to disengage the clutch being effected by fluid pressure. In the construction shown the fluid coupling is urged by compression springs 60 to the clutch engaged position, axial displacement in the opposite direction being effected by movement of an annular piston 61 located in a cylinder 62 provided in the housing 4 upon admission of pressure fluid to the cylinder through port 63, the pressure fluid being exhausted to permit the spring to return the fluid coupling to the clutch engaged position. In a modification of this arrangement the actions of the spring and pressure fluid are reversed.

The axial displacement of the fluid coupling in both directions can also be effected by fluid pressure means. Thus, as shown in FIGURE 7 the thrust bearing ring 19 is operatively connected to a double action piston 64 locoated in a cylinder 65 provided in the housing 4. Admission of pressure fluid through either one of the ports 66 and 66' results in movement of the piston in one direction or the other to effect corresponding axial displacement of the fluid coupling.

In the arrangement disclosed in FIGURE 8 the axial displacement of the fluid coupling to effect clutch engagement is effected by a compression spring 67, vacuum acting on a piston 68 in a cylinder 69 in the housing 4 operating against the spring action to effect axial displacement of the fluid coupling to disengage the clutch. This arrangement can also be modified by reversal of the operation of the spring loading and vacuum.

An arrangement can also be provided in which axial displacement of the fluid coupling in one direction is effected by electromagnetically operated means against spring loading urging the same in the opposite direction. For example, as shown in FIGURE 9 the fluid coupling is urged to the clutch engaged position by a compression spring 70, and moved in the opposite direction against the spring action upon energisation of an electro-magnet denoted generally at 71 co-operating with an armature 72 riveted to the casing of the fluid coupling, current being supplied to the winding of the electro-magnet through a lead 73. In a modification of this arrangement the action of the spring and magnet are reversed.

The axial displacement of the fluid coupling in both directions can be effected by electro-magnetic means. Thus, as shown in FIGURE 10 an electro-magnet 74 co-operating with an armature 75 associated with the thrust bearing ring 19 is provided to effect the axial displacement of the fluid coupling in the direction for clutch engagement; a similar electro-magnet 76 co-operating with an armture 77 rivetted to the casing of the fluid coupling being provided for effecting axial displacement of the fluid coupling in the opposite direction. The electromagnets 74 and 76 are mounted in fixed positions in the housing 4 and are supplied through leads 78 and 79 respectively.

Figure 11:
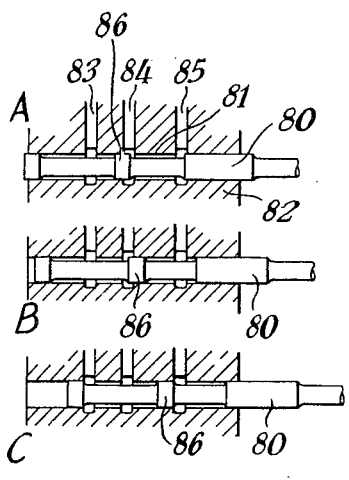
FIGURE 11 shows in section a control valve for pressure fluid operated means effecting the axial displacement, the separate views A, B and C indicating different positions of the valve.

In any of the arrangements utilising fluid pressure either positive or negative for effecting axial displacement of the fluid coupling of FIGURE 1 or the actuation of the independent clutch of FIGURE 2 the supply of the pressure fluid from a suitable source can be regulated by a plunger type control valve of the kind shown in FIGURE 11, and in which the plunger 80 is slidably mounted in the bore 81 of a valve body 82. The bore has three axially spaced ports 83, 84 and 85 connectable respectively to a source of supply of pressure fluid, the cylinder containing the actuation piston, and exhaust. The valve plunger 80 has a land 86 axially positioned so that the plunger can be moved to position the land to connect the ports as shown in views A, B or C of this figure. The movement of the plunger can be effected directly by manually operated means or by automatically operating means.

Figure 12:
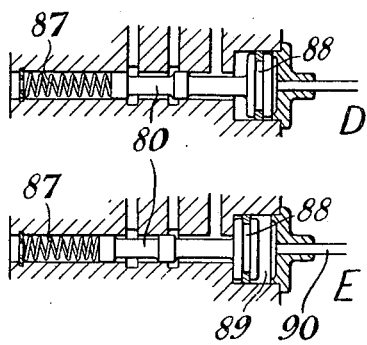
FIGURE 12 shows in section a shuttle valve which can be used in conjunction with the control valve of FIGURE 11, the separate views D and E indicating different positions of the valve.

As shown in FIGURE 12 the valve plunger 80 is spring loaded so as to be urged to one position by a compression spring 87, the plunger being movable axially in the opposite direction by displacement of a piston 88 formed on the plunger end and located in a cylinder 89 and upon admission of pressure fluid to the cylinder 89 through port 90.

The control valve can be operated indirectly and as the result of the performance of another function by an operator. For example the operation of the control valve can be combined with a gear change, the plunger of the control valve being interconnected with the gear selector mechanism. With such an arrangement as it is necessary to fully engage the selected gear before the control valve is operated, lost motion must be provided for in the interconnection between the control valve and the gear selector lever. Arrangements for this purpose are shown in FIGURES 13 and 14, which arrangements will now be described as applied to the control valve shown in FIGURE 11.

According to FIGURE 13 one end of the valve plunger 80 is connected through pivotal connection 91 to a bell crank lever 92 the arm 93 of which is connectable to the gear selector lever linkage not shown, the other arm being provided with a cam slot 94 in which is located a stationary pin 95 carried by the valve body. In the position of rest of the plunger 80 in which it is held by a spring loaded ball detent 96, the pin is located in one end of the cam slot. Upon actuation of the gear selector lever the bell crank lever is subject to pivotal movement to turn the same from the position shown in view F to the position shown in view G, so that the cam slot is aligned with the plunger axis of movement whereby the plunger can be displaced.

In the arrangement shown in FIGURE 14 the lost motion is provided for by overcoming the action of spring loading acting on the control valve plunger 80. For this purpose the plunger 80 is urged to the position of rest by a compression spring 97 acting between a shoulder 98 on a radius arm 100 carried by an extension 99 on the plunger 80 and a shoulder 101 provided at the outer end of the extension. The arm 100 is interconnected with the gear selector lever so that upon operation of the same the arm is permitted to be moved axially in relation to the extension 99 in a direction to bring the same into abutting contact with a collar 102 as shown in view J on the extension 99 continuing movement of the arm 100 being effected jointly with the plunger 80.

FIGURES 15 and 16 show a composite arrangement of control valve such as that disclosed in FIGURE 11 with the means disclosed in FIGURE 6. The device includes a spring loaded clutch operating piston 181 and a plunger valve 180.

FIGURES 17 and 18 show a composite arrangement of the double acting piston of FIGURE 7 with the control valve construction of FIGURES 11 and 12. The device includes a double acting clutch operating piston 164, a valve 165 to automatically transfer pressure fluid from one side of the piston 164 to the other and a plunger valve 166 for supplying the pressure operating fluid.

FIGURES 19 and 20 disclose a fluid transmitter according to the invention suitable for use for example, in the transmission of a road vehicle. The construction includes a fluid coupling arrangement as disclosed in connection with FIGURE 1, the axial displacement of which is effected by the means disclosed in connection with FIGURE 6 of the drawings, the supply of pressure fluid to which is controlled by a control valve of the kind shown in FIGURE 11, the operation of the valve plunger being effected with the required lost motion through the means shown in FIGURE 13 of the drawings. In this arrangement oil supplied from the oil pump driven by the engine of the road vehicle is used as the pressure fluid for actuating the piston causing axial displacement of the fluid coupling the oil being supplied through a supply pipe 103 and returned to the engine sump through a pipe 104. FIGURE 19 shows the transmission in the neutral position with the fluid coupling braked and FIGURE 20 shows the transmission engaged. As shown a dog clutch 105 is provided in the input shaft which is disengaged when the fluid transmitter is in the disengaged position as shown in FIGURE 19. The plunger 80 of the control valve is operated by movement of a hand lever the bell crank lever 92 being operatively associated with the operating slide 106 of the dog clutch 105.

The fluid power transmitter of the present invention is particularly suitable for use with variable speed gearing, i.e. in the transmission of a vehicle.

I claim:

1. In combination, a fluid power transmitter comprising a drive shaft with a flywheel fixed thereto, a driven shaft, a stationary housing with a central opening, a hydraulic fluid coupling casing disposed within said housing, an impeller fixed to said casing having one side provided with a peripheral tapered surface forming a movable element of a cone clutch, said flywheel having a tapered internal surface for cooperation with said movable element, a turbine disposed within said casing for rotation by fluid therein, a sleeve fixed to said turbine for rotation therewith and being fixed to said driven shaft for driving rotation of said driven shaft, a second sleeve fixed to said casing and extending into said central opening, a brake member fixedly secured to the internal surface of said housing adjacent another side of said casing opposite its said one side, means for moving said casing axially toward said flywheel for engaging said clutch elements at one time and for axially moving said casing in the opposite direction at another time, to engage said another side of said casing with said brake member.

2. The combination of claim 1 wherein said casing is provided with a stub shaft extending through said flywheel and into said driving shaft and is rotatable with respect thereto.

3. The combination of claim 1 wherein said means includes a thrust ring bearing having an annular recess fixedly disposed on said second sleeve and an operating fork extending into said recess, a slide rod axially slidably mounted in said stationary housing and connected to said fork to slide said thrust ring and casing toward and away from said flywheel, and a lever pivotally connected to said housing to move said slidable rod.

4. The combination of claim 1 wherein said means includes a thrust ring bearing fixedly disposed on said second sleeve, and mechanical means operatively connected to said bearing to move said casing axially of said flywheel.

5. The combination of claim 1 wherein said means includes a thrust ring bearing fixed on said second sleeve, and a fluid pressure operated piston, and valve control means for controlling the flow of fluid to said piston.

6. The combination of claim 1 wherein said means includes a thrust ring bearing fixed on said second sleeve, and said axially sliding means includes an electromagnet.

References Cited in the file of this patent

UNITED STATES PATENTS

| | | |
|---|---|---|
| 1,283,825 | Libby | Nov. 5, 1918 |
| 1,689,245 | Klimek | Oct. 30, 1928 |
| 1,844,935 | Hinger | Feb. 16, 1932 |
| 2,034,335 | Fisher | Mar. 17, 1936 |
| 2,699,236 | Black | Jan. 11, 1955 |
| 2,777,550 | Forster | Jan. 15, 1957 |
| 2,920,728 | Forster | Jan. 12, 1960 |
| 2,956,449 | Foerster | Oct. 18, 1960 |